(12) United States Patent
Fricke et al.

(10) Patent No.: US 6,191,547 B1
(45) Date of Patent: Feb. 20, 2001

(54) FOCUS CONTROL FOR SEARCH LIGHTS

(75) Inventors: Kenneth J. Fricke, Simi Valley; David Mendez, Valencia, both of CA (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 09/500,753

(22) Filed: Feb. 8, 2000

(51) Int. Cl.[7] .................................................. H02P 7/20

(52) U.S. Cl. ......................... 318/547; 318/17; 318/55; 396/12; 348/144; 362/35; 362/277

(58) Field of Search .................... 318/250–293, 318/17, 157, 55, 547; 240/44, 44.2, 61.05, 61.11; 315/133; 246/220; 362/35, 233, 287, 286, 285, 418, 428, 83.3, 397, 74, 12, 144, 272; 354/65, 73, 74, 75

(56) References Cited

U.S. PATENT DOCUMENTS

| | | | | |
|---|---|---|---|---|
| 3,634,677 | * | 1/1972 | Stuttgart | 240/7.11 J |
| 3,979,649 | * | 9/1976 | Persha | 318/17 |
| 3,987,296 | * | 10/1976 | Coppola et al. | 240/44 |
| 5,030,886 | * | 7/1991 | Darrow | 315/133 |
| 5,490,046 | * | 2/1996 | Gohl et al. | 362/35 |
| 5,589,901 | * | 12/1996 | Means | 396/12 |
| 5,673,989 | * | 10/1997 | Gohl et al. | 362/35 |
| 5,806,956 | * | 9/1998 | Hyun-Jo | 362/35 |

OTHER PUBLICATIONS

"SX–16 Nightsun Searchlight" (Jan. 1988) Spectrolab, Inc., Operation and Maintenance Instructions (9 pages).

"Starburst Searchlight Model SX–5" (Jan. 1988) Spectrolab, Inc. Operation and Maintenance Instructions (8 pages).

* cited by examiner

*Primary Examiner*—Paul Ip
(74) *Attorney, Agent, or Firm*—T. Gudmestad

(57) ABSTRACT

The focus angle of a search light mounted on a helicopter or other platform is narrowed or widened by rotating a bidirectional focus control cam in a clockwise or counterclockwise direction as selected by a manually operated three-position control switch which determines the rotational direction of a DC motor driving the bidirectional focus control cam. The DC motor has first and second terminals which are selectively connected to either a DC power source or ground by a double-pole, single throw dual relay which reverses the polarity and thus the direction of rotation of the DC motor. The dual relay is connected by the same single wire interface currently in use to the manually operated control switch, which manually operated control switch is within a control box located in the helicopter. By operating the manually operated control switch to connect coils in the dual relay to either a power source or to ground, the coils are selectively energized or deenergized causing the dual relay to operate switches that reverse polarity of current flowing through the DC motor. This selectively changes the direction of rotation of the bidirectional cam which advances and retracts a focusing reflector within the search light to widen and narrow its focus angle, thereby widening and narrowing the area illuminated by the search light beam.

21 Claims, 6 Drawing Sheets

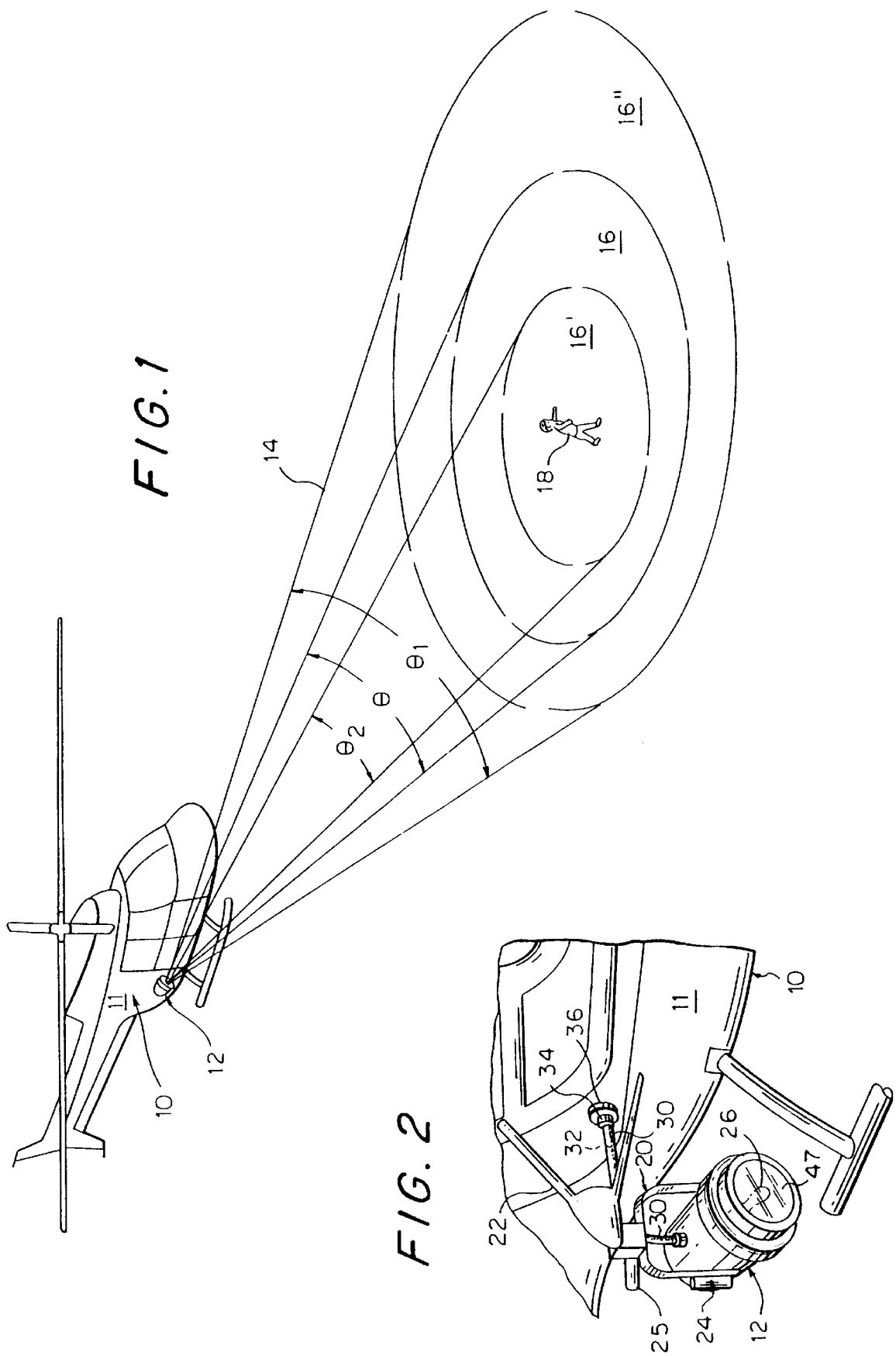

FOCUS CONTROL FOR SEARCH LIGHTS

FIELD OF THE INVENTION

The present invention is directed to a focus control for search lights. More particularly, the present invention is directed to a bidirectional focus control for search lights.

BACKGROUND OF THE INVENTION

Search lights are extensively used on police and rescue helicopters to illuminate subjects on the ground and in the water. Generally, search lights are mounted on gimbles which enable the search lights to be angularly adjusted with respect to helicopters in order for the light beams of the search lights to remain in alignment with subjects under scrutiny. This is necessary because a subject may move with respect to a helicopter, either as the helicopter moves, or when the helicopter is substantially stationary and the subject moves. It is frequently necessary to first illuminate a relatively large area in order to locate whatever subject is of interest and then to progressively illuminate smaller and smaller areas in order to isolate the subject so that the subject can be readily discernable by a helicopter crew or other observers either on the ground or at another location.

Currently, the focus of a search light beam from a helicopter mounted search light is adjusted by a uni-directional cam which is driven to rotate in only one direction by a DC motor. Consequently, if a desired focus angle has been passed and one wishes to change the size of an area illuminated, there is a lag period as the uni-directional cam recycles. This can result in the subject being observed either escaping from or unintentionally moving out of an illuminated area. It is therefore desirable to rotate the cam in both directions in order to enhance an operator's ability to maintain a desired illuminated area or to rapidly change the size of the area without recycling the cam.

In helicopters and fixed-wing aircraft, search lights are generally connected by a connecting wire harness to internal cable systems within the fuselage of the helicopter or aircraft. In accordance with standard practice, there is only a single wire in the connecting wire harness devoted to interfacing with the focus control for the search lights, which focus control axially moves bidirectionally according to the rotational position of the uni-directional cam. Normally in order to make the cam bidirectional, the DC motor must run in both directions. In the prior art bidirectional motor rotation requires two wires, one for each direction of cam rotation. In order to provide a second wire in the wire harness, the wire harness must be changed or re-engineered. Moreover, after the wire harness has been changed or re-engineered, the helicopter or aircraft must be inspected by licensing authorities and the new wiring arrangement approved before the aircraft or helicopter is legally allowed to fly. This is an expensive, time-consuming undertaking which requires not only re-wiring of the connecting harness but also re-wiling of the search lights and search light controls. Consequently, helicopters and aircraft already equipped with search lights having a single wire for focus control forego improvements in focus control which would enable focus control to proceed in both directions rather than a single direction.

In view of the aforementioned considerations, there is a need for an arrangement which allows a search light on a helicopter or an aircraft to be modified in order to have a bidirectional focus control without having to do any re-wiring.

While this problem is primarily a problem with search lights mounted on platforms such as helicopters and fixed wing aircraft, it is also a consideration for other platforms such as search lights mounted on boats and land vehicles and even those mounted on remotely controlled stationary supports.

SUMMARY OF THE INVENTION

It is a feature of the present invention to provide a new and improved focus control for a search light wherein the focus control is bidirectional and requires but a single control wire interface with a control station remote from the search light.

The present invention is directed to a focus control for narrowing and widening the focus angle of a search light beam emitted by a search light mounted on a platform having a power source. The search light includes a motor, a cam driveable by the motor to rotate and a focus control operated by the cam for narrowing and widening the focus angle in response to control signals over a single wire interface between a remotely positioned control switch and the motor. The remotely positioned control switch has an open position, a power source position and a ground position, wherein when the remotely positioned control switch is in the power source position, the single wire interface is in a first state different from a second state of the single wire interface which occurs when the remotely position control switch is in the ground position. A switching circuit is connected between the power source and the motor for reversing polarity of current flowing through the motor. The switching circuit is connected to the remotely positioned control switch by the single wire interface and includes an input responsive to a change in state of the single wire interface, which input reverses the polarity of current flowing through the motor to reverse rotation of the motor and thus the cam. When rotation of the cam reverses, the direction of the focus angle magnitude reverses.

In another aspect of the invention, the motor is a DC motor and circuitry is included for connecting both poles of the DC motor to ground when the remotely positioned switch is in the open position.

In still another aspect of the invention, diodes suppressing voltage spikes are provided between the first and second poles of the motor and the power source, as well as between the poles and ground.

In still another aspect of the invention, the input comprises a pair of coils, one connected to the power source and the other connected to ground. Both coils are directly connected to the single wire interface, whereby a change in state of the single wire interface deenergizes one coil while the other coil remains energized. The coils are each associated with a bipolar switch connected to the DC motor and disposed between ground and the power source, the bipolar switches individually changing connections to reverse polarity of current flowing through the DC motor as the coils are individually deenergized due to changes in state of the single wire interface.

Aspect of the invention, in order to protect the coils, protective diodes are disposed between the power source of the coils and the single wire interface, as well as between ground and the single wire interface.

In still a further aspect of the invention, the switching circuit is a double-pole, single-throw dual relay.

In a more specific aspect of the invention, the platform upon which the search light is mounted is a helicopter or fixed wing aircraft having a fuselage; the search light being mounted on the helicopter or aircraft at a location exterior to the fuselage and the remotely positioned switch being within the fuselage and connected to the switching circuit by the single wire interface.

In still another aspect of the invention, the switching circuit includes a double-pole, single-throw dual relay and includes circuitry for connecting both poles of the DC motor to ground when the remotely positioned switch is in the open position.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein:

FIG. 1 is a perspective view of an airborne platform, such as a helicopter, having a search light mounted thereon, wherein the search light has an adjustable focus;

FIG. 2 is a perspective view of a portion of the airborne platform of FIG. 1 showing a search light employing features of the present invention mounted thereon;

DETAILED DESCRIPTION

Figure 3:
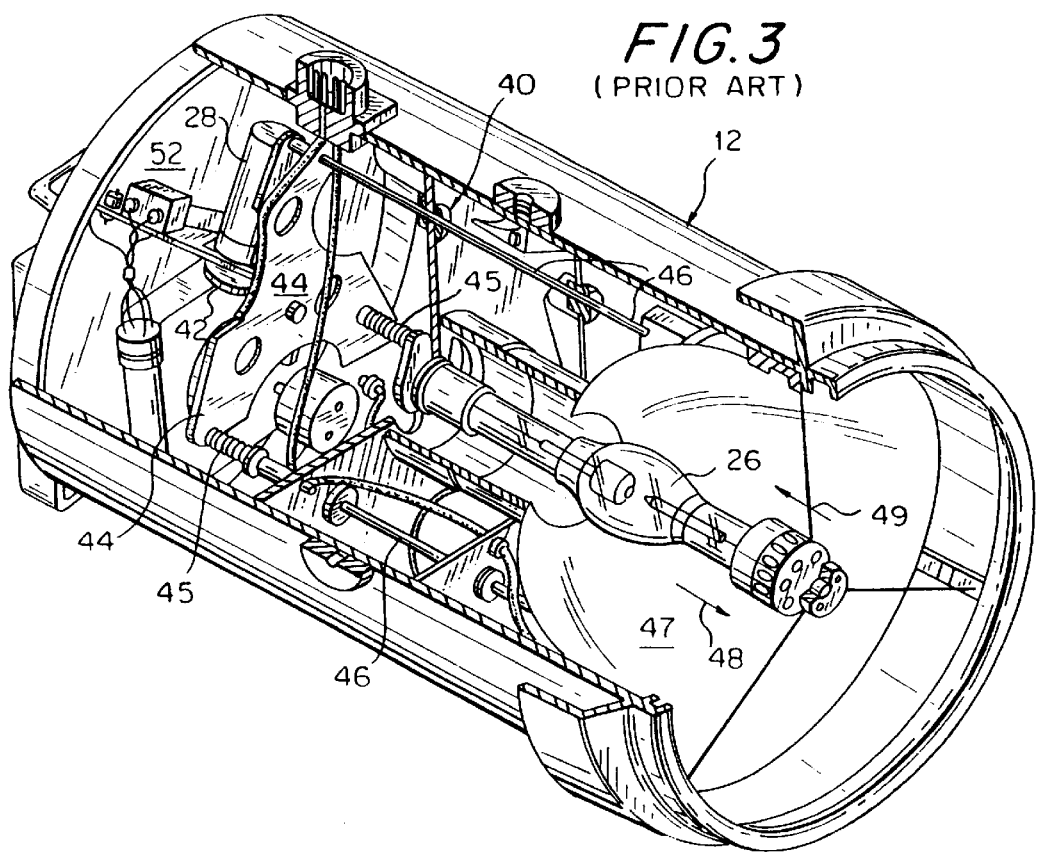
FIG. 3 is a perspective view of a search light configured in accordance with the prior art showing a cam driven by a motor for adjusting the focus of the search light of FIGS. 1 and 2.

Referring now to FIG. 1, there is shown a platform in the form of a helicopter 10 having a fuselage 11 with a search light 12 mounted thereon, the search light casting a light beam 14 with a focus angle $\theta$, which light beam illuminates an area 16 of ground or water. Frequently, it is desirable to expand or decrease the area 16 being illuminated by expanding or contracting the focus angle $\theta$ of the beam 14. For example, in order to search a large area 16' for a particular subject 18, the beam 14 has a wide focus angle $\theta_1$. In order to concentrate on a specific subject 18, such as the person, the beam 14 is progressively narrowed to have a focus angle of $\theta_2$, illuminating a smaller area 16". In accordance with the present invention, the focus angle $\theta$ is changeable bidirectionally by a control within the helicopter 10 to either immediately widen the focus angle $\theta$ so as to approach $\theta_1$, or to immediately narrow the focus angle so as to approach $\theta_2$.

Referring now to FIG. 2, it is seen that the search light 12 is mounted on a gimble 20 which is in turn supported by a tripod arrangement 22 attached to the fuselage 11 of the helicopter 10. The gimble 20 is driven by electric drives 24 and 25 to steer the beam 14 so that the beam can move independently of the orientation of the helicopter 10. The search light 12 also includes a bulb 26 and an internal focus DC control motor 28 (see FIGS. 3 and 4). The drive 24, bulb 26 and focus motor 28 each receive +28 volt DC power from the helicopter 10 through an external wire harness cable 30, which wire harness cable 30 includes a single wire interface 32 (see FIGS. 5–8) for controlling the DC motor 28.

As is seen in FIG. 2, the wire harness 30 has a connector 34 at one end thereof which plugs into a cooperating connector 36 connected to internal cables (not shown) within the fuselage 11 of the helicopter 10. The type of search light 12 is exemplified commercially by search lights available from SpectroLab, Inc., of Sylmar, Calif., a Hughes Electronics Corporation company, and identified as NIGHTSUN® SX-16® and STARBURST SX-5® search lights.

Figure 4:
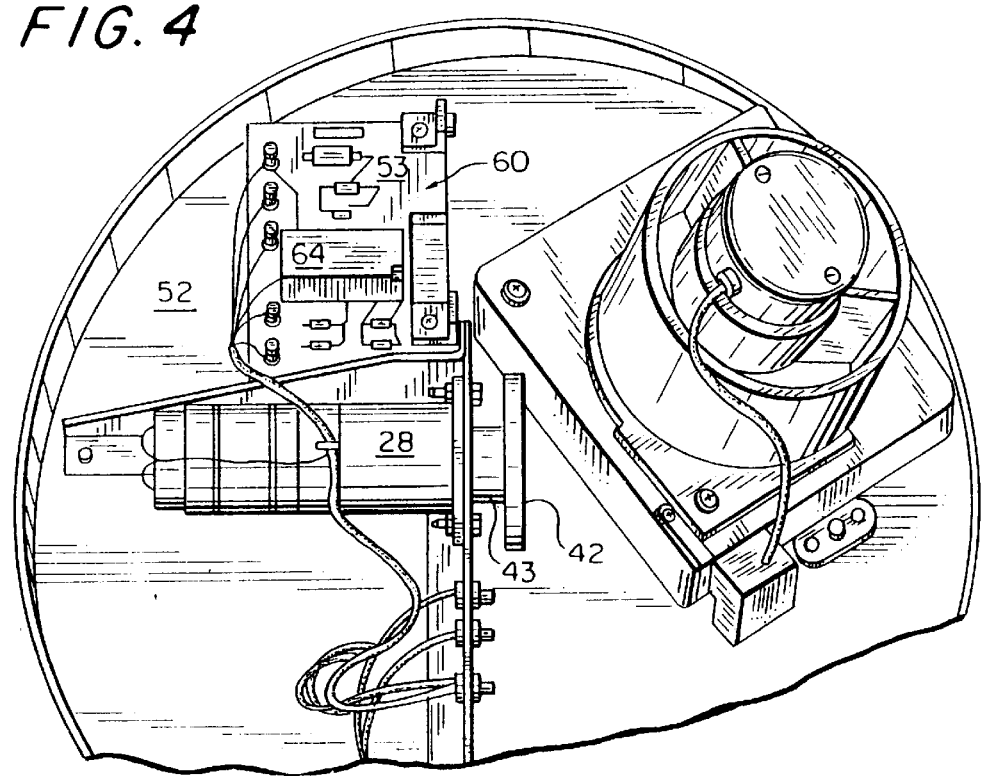
FIG. 4 is a perspective view of a back plate of the search light of FIG. 3 modified to include circuitry configured in accordance with the present invention.
Figure 5:
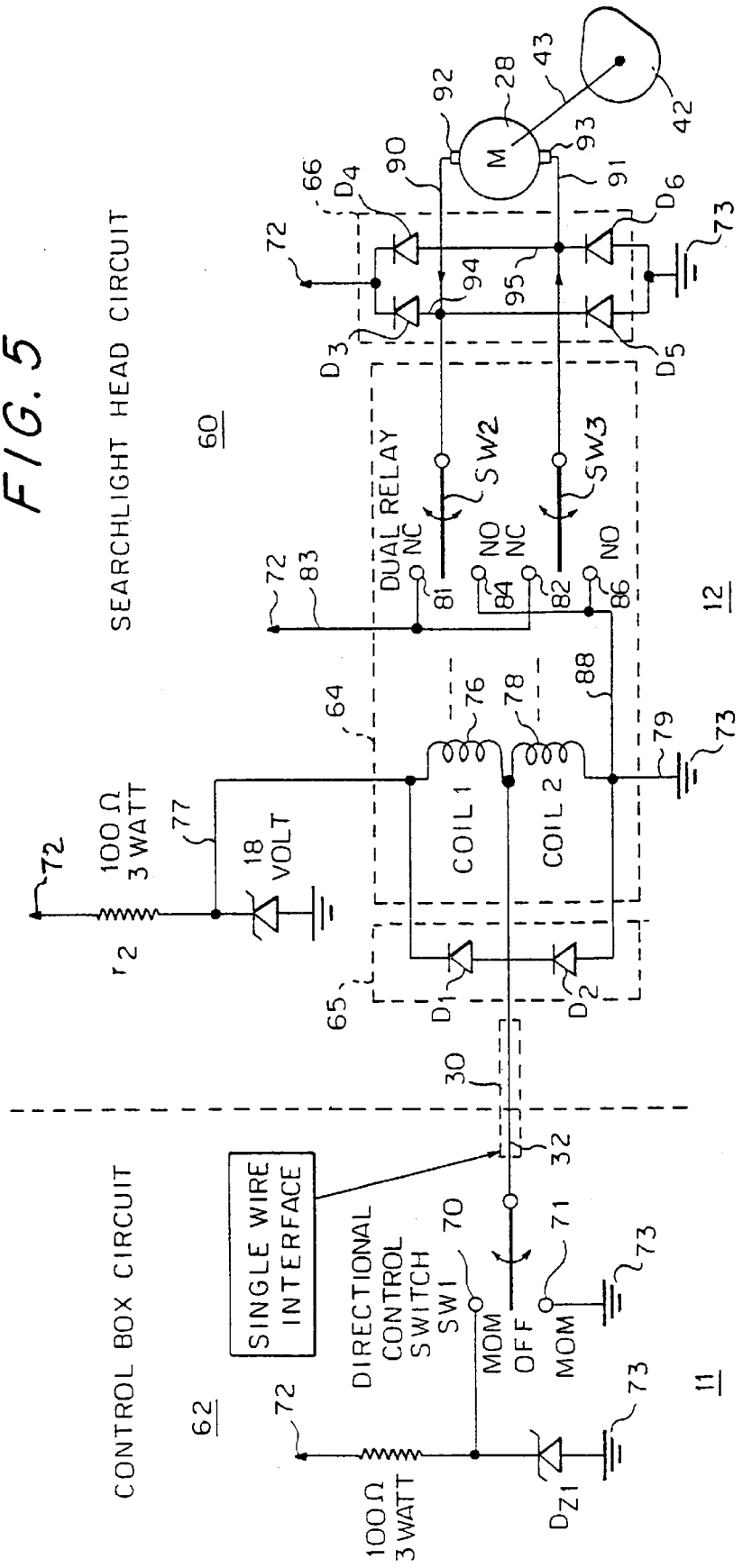
FIG. 5 is a circuit diagram illustrating a search light focus control circuit configured in accordance with the principles of the present invention, the circuit being in an inactive mode prior to applying electric power to the circuit.
Figure 6:
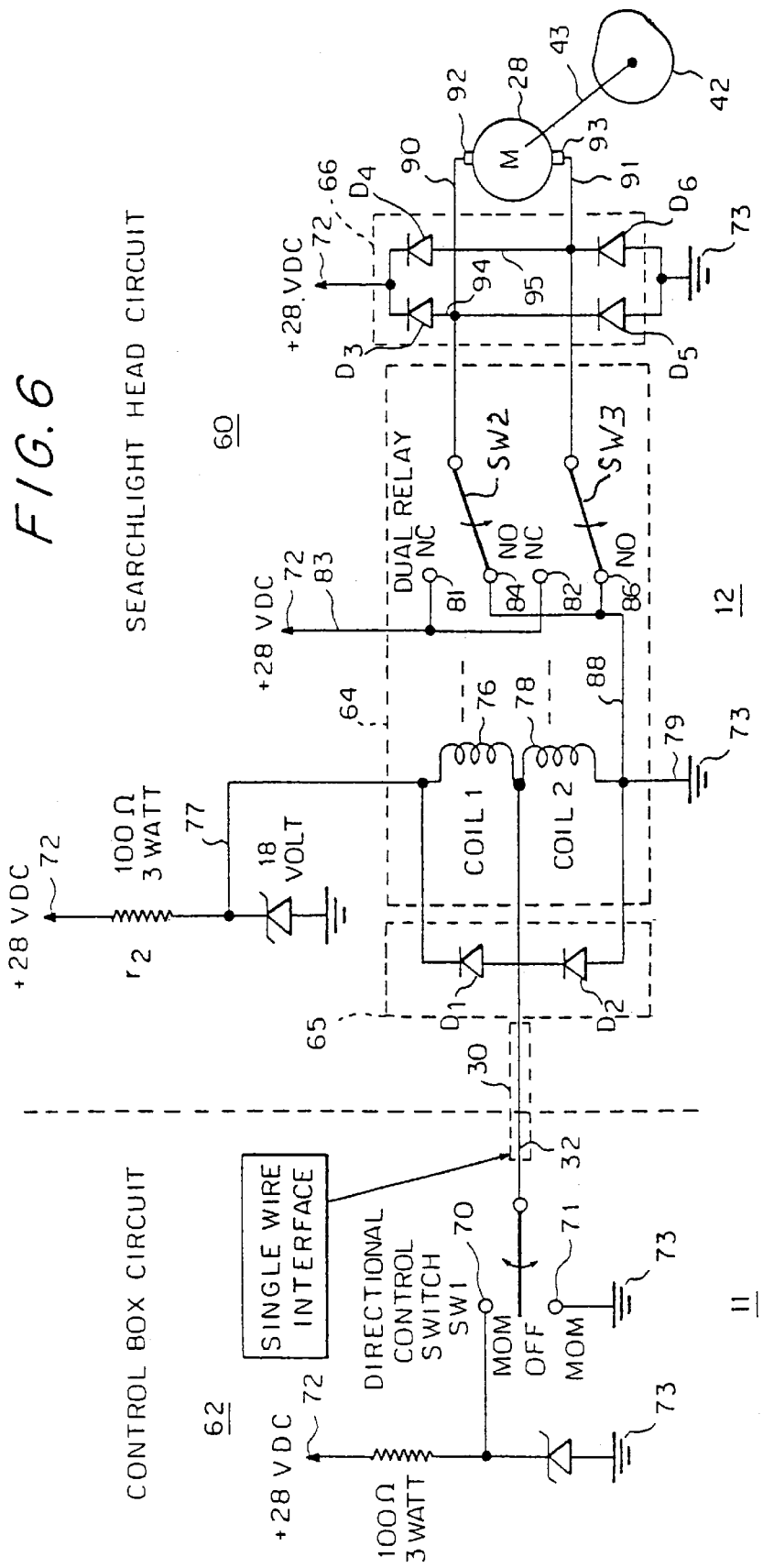
FIG. 6 is the circuit of FIG. 5 but showing the circuit energized by DC current applied thereto.

Referring now mainly to FIGS. 3 and 4, where interior portions 40 of the search light 12 are shown, it is seen that the motor 28 drives a cam 42 as armature 43 rotates. The cam 42 abuts a cam follower 44 which is urged by springs 45 against the cam. The cam follower 44 is connected by rods 46 to a reflector 47 which, when moved axially in the direction of arrow 48, narrows the focus angle $\theta$ toward the minimum focus angle $\theta_2$ and which when moved in the direction of the arrow 49 widens the focus angle $\theta$ toward the maximum focus angle $\theta_1$.

Referring now mainly to FIG. 4, the housing of the search light 12 has a back plate 52 on which has been mounted a circuit board 53, which in turn mounts the components of a search light head circuit 60. The search light head circuit is a switching circuit through which current passes to drive the DC motor 28 to rotate the armature 43 in either a clockwise direction or the counter-clockwise direction.

According to the present invention, the armature 43 of the DC motor 28 bidirectionally rotates the cam 42 in order to axially slide focus control rods 46 and thus axially position the reflector 47. The focus control rods 46 and the cam 42 already exists in prior art search lights 12 if the search lights are exemplified by the NIGHTSUN SX-16® and STARBURST SX-5® search lights. In accordance with the prior art, the DC motor 28 rotates the cam 42 in only one direction. Consequently, there can be a lag period as the cam 42 cycles around to a desired focus angle that was passed in a previous focus angle adjustment. By utilizing the present invention, the lag time is eliminated because the rotation of the cam 42 is now bidirectional.

Having a bidirectional cam 42 to allow an immediate change in the magnitude of the focus angle $\theta$ is of considerable interest to police departments. This is because the focus angle $\theta$ is only one of several activities preformed by a police helicopter pilot during a search in that the pilot must also adjust the search light 12 while simultaneously flying the helicopter 10 and talking on the radio. TV stations fly their own helicopters videoing the pursuit of criminal suspects. The pursuit is broadcast in real time by television stations as information for, and perhaps entertainment of, the general public. If a pursuit takes place at night, the search light beam 14 is of primary significance and is an important aspect in enhancing the spectacle. The police helicopter pilot then has the added pressure of thousands of excited television fans before whom he must perform. Having bidirectional focus angle control makes it less likely that pilot will mess up and lose sight of the suspect, a mistake not lot on his television audience. This enhancement of focus angle control is also of enormous value in other operations, such as, for example, attempting a rescue at sea during a storm, rescuing hikers stranded in the wilderness or medivacting the injured or sick.

Referring now to FIGS. 5–8, there is shown a diagram of circuitry according to the present invention which allows the search light head circuit 60 disposed within the search light 12 to function as a switching circuit controlled from a control box circuit 62 situated within the fuselage 11 of the helicopter 10 by utilizing only the single wire interface 32 currently within the wiring harness 30. The search light head circuit 60 includes a dual relay 64 which is connected through a protective diode pair 65 to the single wire interface 32 as well as a diode array 66 which protects the motor 28 from voltage spikes.

Figure 7:
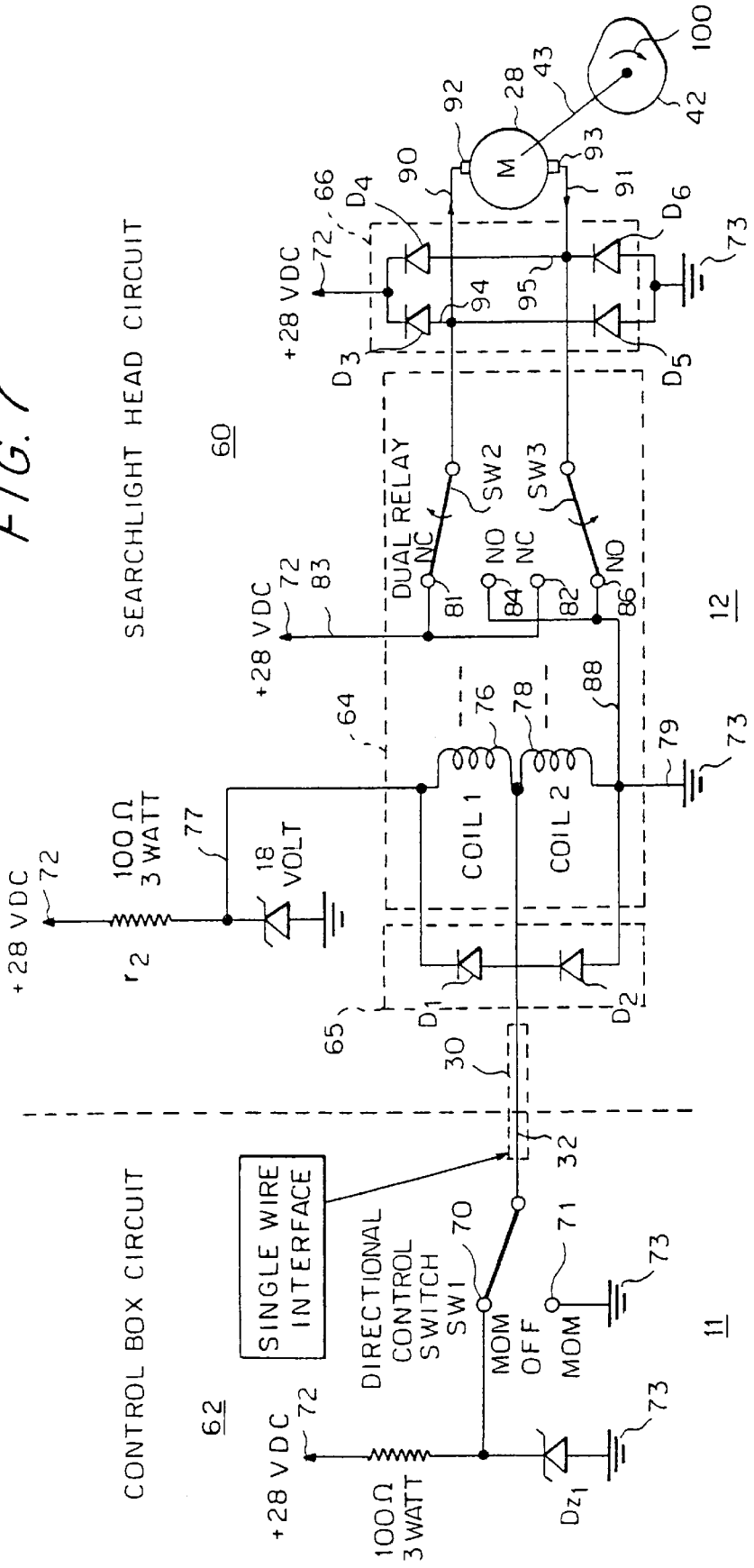
FIG. 7 is the circuit of FIGS. 5 and 6 but showing the circuit energized to rotate the armature of a focus control motor to drive a bidirectional cam in a clockwise direction.
Figure 8:
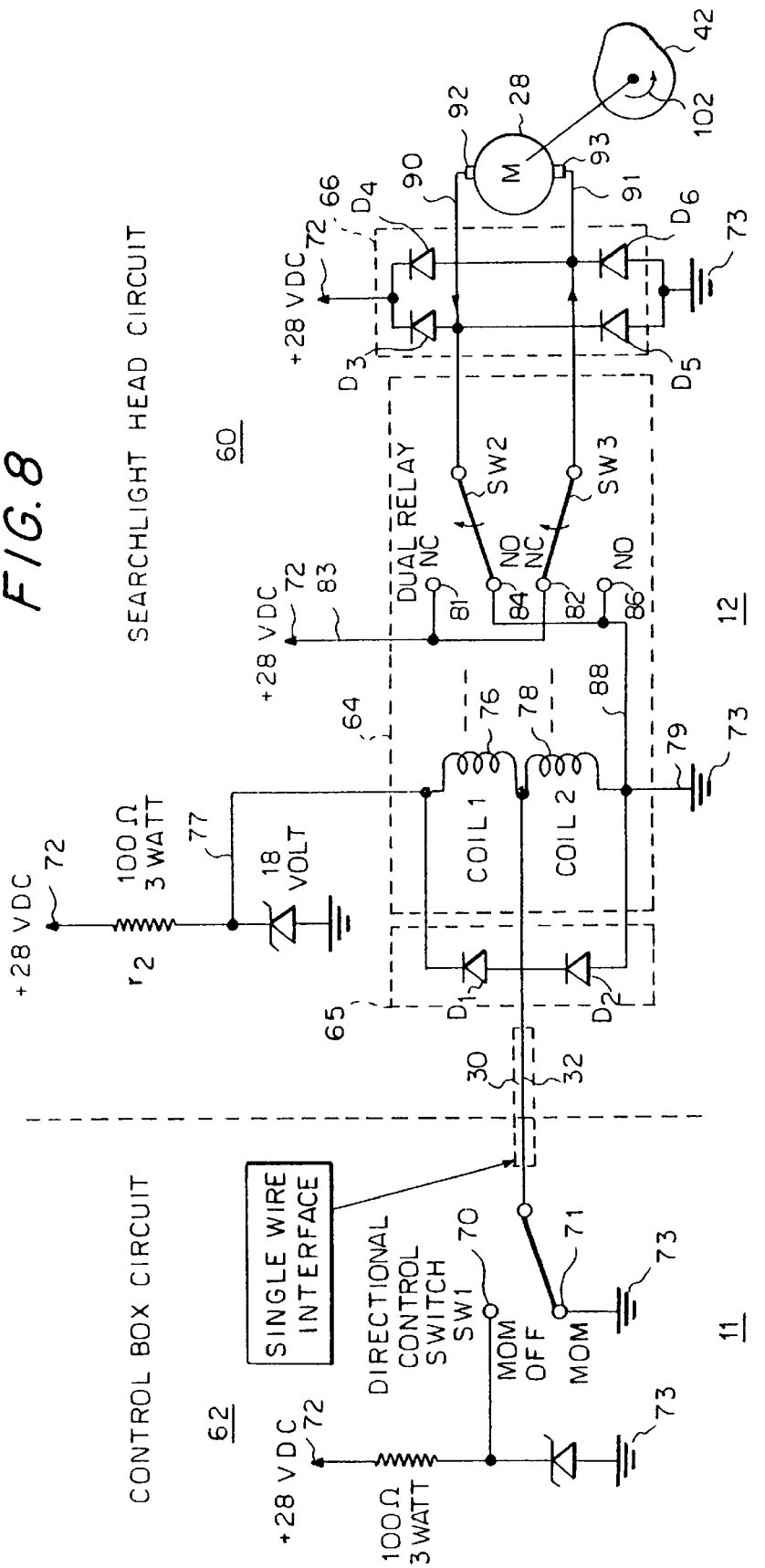
FIG. 8 is the circuit of FIGS. 5–7 but showing the circuit energized to rotate the armature of the focus control motor to drive the bidirectional cam in a counter-clockwise direction.

Within the control box circuit 62 located in the helicopter 10 there is a remotely positioned, bidirectional control switch SW1 that is connected to the dual relay 64 in the search light head circuit 60 by the single wire interface 32. Since the control switch SW1 is in the fuselage of the helicopter 10, it is remotely positioned with respect to the search light 12 which is mounted exteriorly with respect to the fuselage in the tripod 22. The control switch SW1 is a manual switch having three positions, i.e., the OFF position shown in FIGS. 5 and 6 in which both momentary contacts 70 and 71 are open; a first momentary closed position in which momentary contact 70 is closed as is shown in FIG. 7, and a second momentary closed position in which the momentary contact 71 is closed as is shown in FIG. 8. As will be explained hereinafter, there is a change in state on the single wire interface depending on the position of the control switch SW1 so that in the first momentary closed position, the DC motor 28 rotates the focus control cam 42 clockwise as is shown in FIG. 7 and in the second momentary closed position of FIG. 8, the DC motor 28 rotates the cam 42 in the counter-clockwise direction as is seen in FIG. 8.

In a preferred embodiment of the invention, the dual relay 64 is a double pole, single throw relay. As is seen in FIG. 4, the dual relay 64 is conveniently mountable on circuit board 53 attached to the back plate 52 of the housing of search light 12, which back plate already has space available to receive the circuit board 53, thus allowing unidirectional prior art focusing arrangements to be conveniently converted to bidirectional focusing arrangements.

Considering the circuit elements more specifically, the momentary closed contact 70 is connected through a 100 ohm 3-watt resistor R1 to a power source provided by a +28 volt DC power supply 72 and through a first 18-volt Zener diode $D_{Z1}$ to ground 73. Throughout these drawing figures the power source is the helicopter's +28 volt DC power supply 72 and ground 73 is the helicopter grounding system. In other applications the power source may be different, for example, in a boat or motor vehicle the power source may be +12 volt DC. The dual relay 64 has a first coil 76 therein which is connected via a line 77 to the 28-volt DC power source via a 100 ohm 3-watt resistor R2 and which is connected to ground through a second 18-volt Zener diode $D_{Z2}$. A second coil 78 is connected directly to ground via a line 79, while the first coil 76 and second coil 78 are mutually connected to the single wire interface 32 through protective diode pair comprising diodes D1 and D2. The protective diodes D1 and D2 are flyback diodes which clamp any voltage flybacks which occur when the coils 76 and 78 are de-energized, thereby protecting the coils, also within the dual relay 64 are switches SW2 and SW3. Switches SW2 and SW3 close normally closed contacts 81 and 82 connected to the +28-volt DC power supply 72 via line 83 while normally open contacts 84 and 86 are connected to ground 73 via line 88. The coils 76 and 78 provide an input to the switches SW2 and SW3 which is responsive to a change in state on the single wire interface 32 which as explained hereinafter reverses polarity of current flowing through the motor 28.

The DC motor 28 is connected via line 90 to the +28-volt DC power supply 72 through protective diode D3 while the line 91 is connected to the +28-volt power supply 72 through protective diode D4. Line 90 is also connected to ground through protective diode D5 while line 91 is connected to ground 73 through protective diode D6. The diodes D3–D6 suppress both positive and negative voltage spikes that are generated when switching the DC motor 28 "on" and "off". The Zener diodes $D_{Z1}$ and $D_{Z2}$ regulate the power supply voltage down from +28 volts DC to +18 volts DC for use by the manual control switch SW1 and by the components of the dual relay 64.

Considering now the operation of the circuitry of FIGS. 5–8, FIG. 5 illustrates the condition of circuitry when the helicopter 10 is not operating and thus not generating +28-volt DC power for the power supply 72. Accordingly, in FIG. 5 the +28-volt DC power is not shown. In this condition, switch SW1 in the control box circuit 62 is in the OFF position and the switches SW2 and SW3 and the dual relay 64 arc open.

Upon starting the helicopter 10 so as to supply +28-volt DC power, the switch SW1 remains open but the switches SW2 and SW3 automatically switch to a normally open mode in which they contact the normally open contacts 84 and 86 so as to connect both line 90 and line 91 to ground 73 by energizing both the first coil 76 and the second coil 78. When switch SW1 is open, no voltage from the control box 62 in the fuselage 11 of the helicopter 10 is present on the single wire interface 32, consequently the voltage is allowed to float to a potential of about +9 volts due to the matched resistance of the first and second coils 76 and 78 and the +18 volt Zener diode $D_{Z2}$ connected to coil 76. By having +9 volts across the coils 76 and 78, there is enough voltage to energize each of the relay switches SW2 and S W3 which results in both relay switches moving to the normally open position in which the normally open contacts 84 and 86 are closed. The DC motor 28 is thus grounded on both poles provided by terminals 92 and 93 thereof because the +28 volt DC power supply 72 is applied to both line 90 and line 91 by lines 94 and 95, respectively. The armature 43 of the DC motor and thus the bidirectional cam 42 are then positively held stationary with no rotation.

Referring now to FIG. 7 in which clockwise rotation 100 of the armature 43 and cam 42 occurs, it is seen that when the switch SW1 is moved to close with the contact 70, there is a change in state on the single interface wire from an inactive state to a first active state where +18 volts is applied through the single interface wire 32, the resistor $R_1$ having reduced the +28 volt DC power supply 72. Application of +18 volts to the single wire interface 32 to place the single wire interface in the first state causes the first coil 76 to de-energize while the second coil 78 remains energized. This causes the first relay switch SW2 to close with the contact 81 while the second relay switch SW3 remains closed with the normally open contact 86. Current therefore flows through the first relay switch SW2, line 90 and DC motor 28 to ground 73 through line 91 and the second relay switch SW3. This causes the armature 43 of the motor 28 to rotate the bidirectional cam 42 in the clockwise direction 100 as long as the switch SW1 in the control box circuit 62 closes with the contact 70. Upon releasing the switch SW1, the first relay switch SW2 returns to the OFF position so that the first relay switch SW2 opens the normally closed contact 81 and closes the normally open contact 84, thus returning the circuitry to the mode of FIG. 6, which positively holds the armature 43 and thus the cam 42 positively fixed with no rotation so as to stabilize the selected focus angle θ of the beam 14. Referring now to FIG. 8 if it is desired that the armature 43 and the cam 42 rotate in the counter-clockwise direction 102, the manual switch SW1 is moved from the inactive off state to close with contact 71 which puts the single interface wire 32 in a second active state. This causes the second coil 78 to de-energize while the first coil 76 remains energized which results in the second relay switch SW3 closing with contact 82 while the first relay contact switch SW2 remains closed with the normally open contact 84. Power supplied +28-volt DC current flows through the second relay switch SW3 over line 91 and through the motor 28 to line 90. Line 90 is connected to ground 73 through the first relay switch SW2 so that in the mode of FIG. 8, the direction of current flow to the DC motor 28 is reversed with respect to current flow through the DC motor in the mode shown in FIG. 7. This causes the armature 43 and cam 42 to rotate in the counter-clockwise direction 102. When the manual control switch SW1 in the control box circuit 62 is thereafter moved to the OFF position, the second relay switch SW3 opens contact with the normally closed contact 82 and closes contact with the normally open contact 86 so that the circuit arrangement returns to the mode of FIG. 6. As was stated before, when the circuit arrangement is in the stabilized mode of FIG. 6, the armature 43 is electrically locked to positively fix the bidirectional cam 42 in its last position so that the cam cannot inadvertently rotate and change the focus angle θ.

While the circuit disclosed in FIGS. 5–8 is a preferred circuit, corresponding circuits using equivalent components such as power transistors and chips which are now available or which may become available in the future are within the purview of this disclosure.

In the aforedescribed exemplary embodiment of the invention, the following specific circuit components were used:

Dual relay 64—double pole, single-throw dual relay Model No. V2R1002, available from Potter & Brumfield;

DC Motor 28—DC motor with a permanent magnet available from Globe Motors Co.;

Zener diodes $D_{Z1}$ and $D_{Z2}$—1N5355B-18 volts;

Diodes D1–D6—IN4936, and

Resistors R1 and R2—100 ohm, 3-watt

While the focus control described herein is especially useful for search lights 12 mounted on helicopters 10, it is also useful for mounting on fixed wing aircraft, boats, land vehicles, and stationary illuminating facilities. With applications other than helicopters and fixed-wing aircraft the power supply voltages may need to be altered so that the platform upon which the search light is mounted can readily accept the modification set forth in this disclosure. For example, boats and land vehicles may have a 12-volt DC power supply 72 so that the components of the circuits as shown in FIGS. 5–8 would need to be modified to operate from a 12-volt DC power supply rather than a 28 volt DC power supply.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A focus control for narrowing and widening the focus angle of a search light beam emitted by a search light mounted on a platform having a power source, wherein the search light includes an electric motor, a cam driveable by the motor to rotate and a focus control operated by the cam for narrowing and widening the focus angle in response to control signals over a single wire interface between a remotely positioned control switch and the motor, the focus control comprising:

an open position, a power source position and a ground position selectively assumable by the remotely positioned control switch, wherein when the remotely positioned control switch is in the power source position, the single wire interface is in a first state different from a second state of the single wire interface which occurs when the remotely positioned control switch is in the ground position, and a switching circuit connected between the power source and the motor for reversing polarity of current flowing through the motor, the switching circuit being connected to the remotely positioned control switch by the single wire interface and including an input responsive to a change in state on the single wire interface to reverse the polarity of current flowing through the motor to reverse rotational direction of the motor, whereby when the cam reverses rotational direction thereby reversing the widening or narrowing of the focus angle.

2. The focus control of claim 1, wherein the motor is a DC motor and wherein circuitry is included for connecting both poles of the DC motor to ground when the remotely positioned switch is in the open position and the power source is energized and wherein the motor is energized when the remotely positioned control switch is in a neutral position which is neither the power source nor ground position.

3. The focus control of claim 2, wherein diodes are disposed between the first and second poles of the DC motor and the DC power source and between the poles and ground.

4. The focus control of claim 2, wherein the input comprises a pair of coils, one connected to the power source; the other connected to ground, and both directly connected to the single wire interface whereby a change in state of the single wire interface deenergizes one coil while the other remains energized, the coils each being associated with a bipolar switch connected to the DC motor and the coils being disposed between ground and the power source, the bipolar switches individually handing connections to reverse polarity of current flowing through the DC motor as coils are individually deenergized due to changes in state of the single wire interface.

5. The focus control of claim 4, wherein protective diodes are disposed between the DC power source of the coils and the single wire interface as well as between ground and the single wire interface to protect the coils.

6. The focus control of claim 1, wherein the switching circuit is a double-pole, single-throw dual relay.

7. The focus control of claim 1, wherein the platform is a helicopter or fixed wing aircraft having a fuselage; wherein the search light is mounted on the helicopter or aircraft at a location exterior to the fuselage and the remotely positioned switch is disposed within the fuselage and connected to the switching circuit by the single wire interface.

8. The focus control of claim 7, wherein the motor is a DC motor and the switching circuit is a double-pole, single-throw dual relay.

9. The focus control of claim 7, further including circuitry for connecting both poles of the DC motor to ground when the remotely positioned switch is in the open position.

10. The focus control of claim 2, wherein diodes are disposed between the first and second poles of the DC motor and the DC power source and diodes are disposed between the poles and ground.

11. A focus control for narrowing and widening the focus angle of a search light beam emitted by a search light on a platform having a DC power source, wherein the search light includes a DC motor, a cam driven to rotate by the DC motor and a focus control operated by the cam for narrowing and widening the focus angle in response to control signals over a single wire interface between a remotely positioned control switch and the motor, the focus control comprising:

an open position, a power source position and a ground position assumable by the remotely positioned control switch;

a relay arrangement comprising a first coil adapted to be connected to the power supply and a second coil adapted to be connected to ground with both coils adapted to be connected to the remotely positioned control switch by the single wire interface; a first relay switch operated by the first coil and adapted to be connected to a first pole of the DC motor, the first relay switch being selectively connected to ground when the first coil is energized and to the DC voltage source when the first coil is deenergized, and a second relay switch operated by the second coil and adapted to be connected to a second pole of the DC motor, the second relay switch being selectively connected to ground when the second coil is energized and to the DC power source when the second coil is deenergized; whereby upon energizing the first and second coils while leaving the remotely positioned control switch open, the cam driven by the DC motor is positively held stationary; upon deenergizing the first coil while the second coil is energized, the cam is rotated in a first direction to alter the magnitude of the focus angle in the first direction, and upon deenergizing the second coil while the first coil is energized the cam is rotated a second direction opposite the first direction to alter the magnitude focus angle in a direction opposite the first direction.

12. The focus control of claim 11, wherein between the first and second poles of the DC motor and the DC power source and between the poles and ground, diodes are disposed to suppress voltage spikes.

13. The focus control of claim 12, wherein protective diodes are disposed between the DC power source connected to the first coil and the single wire interface as well as between ground connected to the second coil and the single wire interface to protect the first and second coils.

14. The focus control of claim 11, wherein diodes are disposed between the first and second poles of the DC motor and the DC power source and diodes are disposed between the poles and ground.

15. The focus control of claim 11 wherein the platform is a helicopter or fixed wing aircraft having a fuselage; wherein the search light is mounted on the helicopter or aircraft at a location exterior to the fuselage and the remotely positioned switch is disposed within the fuselage and connected to the switching circuit by the single wire interface.

16. The focus control of claim 11 wherein the relay arrangement is a double-pole, single-throw dual relay.

17. A focus control for narrowing and widening the focus angle of a search light beam emitted by a search light mounted on a platform having a power source, wherein the search light includes a D.C. motor, a cam driveable by the motor to rotate and a focus control operated by the cam for narrowing and widening the focus angle in response to control signals over a single wire interface between a remotely positioned control switch and the motor, the focus control comprising:

an open position, a power source position and a ground position selectively assumable by the remotely positioned control switch, wherein when the remotely positioned control switch is in the power source position, the single wire interface is in a first state different from a second state of the single wire interface which occurs when the remotely positioned control switch is in the ground position, and a switching circuit connected between the power source and the motor for reversing polarity of current flowing through the motor, the switching circuit being connected to the remotely positioned control switch by the single wire interface and including an input responsive to a change in state on the single wire interface to reverse the polarity of current flowing through the motor to reverse rotational direction of the motor and the cam to thereby reverse the widening or narrowing of the focus angle, the switching circuit further including a circuit arrangement for connecting both poles of the DC motor to ground when the remotely positioned switch is in the open position and the power source is energized to thereby positively hold the cam driven by the motor is the last position selected upon releasing the remotely positioned switch.

18. The focus control of claim 17, wherein diodes are disposed between the first and second poles of the DC motor and the DC power source and between the poles and ground.

19. The focus control of claim 17, wherein the input comprises a pair of coils, one connected to the power source; the other connected to ground, and both directly connected to the single wire interface, whereby a change in state of the single wire interface de-energizes one coil while the other remains energized, the coils each being associated with a bipolar switch connected to the DC motor and the coils being disposed between ground and the power source, the bipolar switches individually handing connections to reverse polarity of current flowing through the DC motor as coils are individually de-energized due to changes in state of the single wire interface.

20. The focus control of claim 17, wherein the platform is a helicopter or fixed wing aircraft having a fuselage; wherein the search light is mounted on the helicopter or aircraft at a location exterior to the fuselage and the remotely positioned switch is disposed within the fuselage and connected to the switching circuit by the single wire interface.

21. The focus control of claim 17 wherein the power source includes a power supply which provides direct current to the switching circuit and the motor; which direct current is isolated from other currents available from the power source.

* * * * *